Patented Sept. 17, 1940

2,214,971

UNITED STATES PATENT OFFICE 2,214,971

CYANO AND THIOCYANO COMPOUNDS AND A PROCESS FOR THEIR MANUFACTURE

Paul Müller, Neu-Allschwil, near Basel, Switzerland, assignor to the firm J. R. Geigy A. G., Basel, Switzerland No Drawing. Application December 23, 1938, Serial No. 247,536. In Switzerland December 27, 1937

12 Claims. (Cl. 260—454)

This invention relates to a manufacture of a series of new cyano and thiocyano compounds, wherein a compound of the formula

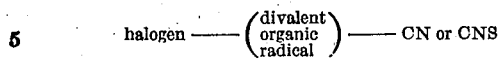

containing exchangeable halogen, is caused to react with ammonia or an amine.

When ammonia or a non-tertiary amine is used there is produced by elimination of the corresponding hydrogen compound H-halogen a primary, secondary or tertiary compound which may be used in the form of a base or converted into a water-soluble form by means of an acid.

The primary or secondary substituted products of the reaction may be further alkylated or aralkylated by the usual alkylating or aralkylating agents. When this treatment is exhaustive, there are obtained as final products quaternary ammonium compounds which may also be obtained from the tertiary substituted product of the reaction by addition of suitable compounds, especially acid esters, by the usual methods.

If, on the other hand, there are used tertiary substituted amines as parent material, which may be substituted in any desired manner, these amines may be converted into ammonium compounds by addition of the above defined compound halogen —— (divalent organic radical) —— CN or CNS.

Suitable organic divalent radicals are especially aliphatic or araliphatic radicals which may contain substituents. As amines there are of value for the reaction aliphatic, aromatic and cycloaliphatic compounds.

The new cyano or thiocyano compounds may be used for various purposes in the form of bases dissolved in suitable solvents, or in the form of salts or quaternary compounds dissolved in water. In part they are valuable capillary active agents, for instance wetting, dispersing and emulsifying agents. In part they are poisons suitable for combating moths and other pests of the insect class; in the case of some compounds there is a specially pronounced fungicidal or bactericidal effect which exceeds that of bodies of similar composition without the CN or CNS group.

The following examples illustrate the invention, the parts being by weight:

Example 1

12 parts of dimethylaminoacetic acid-3:4-dichloranilide (made by heating a benzene solution of 3:4-dichloraniline with chloracetyl chloride for about 12 hours at 70° C. and causing the product to react while stirring well with an aqueous solution of dimethylamine of 20 per cent strength, first for 6 hours at room temperature and then for 12–14 hours at 70–80° C.) are dissolved in 30 parts of benzene, 7 parts of α,β-chlorethylene thiocyanate are added and the whole is boiled under reflux for 24–48 hours. The grey pulverulent substance which collects at the bottom of the vessel is filtered and purified by washing with acetone. There is thus obtained a light-grey powder freely soluble in water and of good fungicidal and bactericidal properties.

The following equation illustrates the reaction involved:

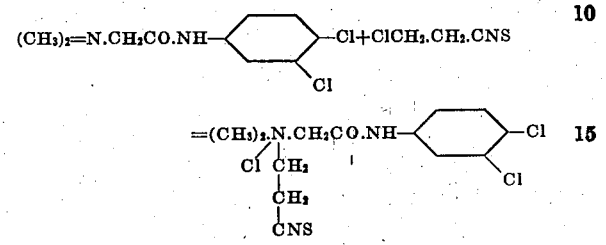

Example 2

7 parts of the same base as is used in Example 1 are dissolved in 20 parts of benzene and 3 parts of α-chlorethylene-β-nitrile are added. Already after a few hours there separates a fine white crystalline powder. This is filtered with suction and washed with benzene.

When dry the product is a white powder of good solubility in water.

The following equation illustrates the reaction involved:

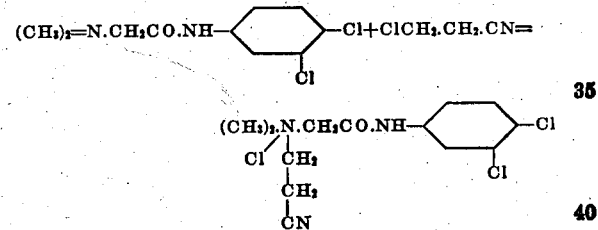

Example 3

1 mol. of dimethylaminoacetic acid-4'-chlorophenyl ether phenyl-4-amide (made by condensation of 1 mol. of para-nitrochlorobenzene with 1.2 mol. of para-chlorophenol at 130–140° C. by adding by drops in the course of 2–4 hours caustic potash lye of 50 per cent strength, heating for 4–5 hours at 150–160° C., reduction in known manner of the nitro compound thus obtained and reaction of the amine produced with chloracetyl chloride and dimethylamine as described in Example 1) is dissolved in benzene and caused to react with 1 mol. of α,β-chlorethylene thiocyanate. After heating for several days under reflux, the quaternary ammonium compound will have separated in pulverulent form. It is filtered with suction, washed with benzene and dried; it is then a white powder which dissolves clearly in water and protects wool, hair, feathers, furs, leather or the like from the attack of moth, even when used in low concentration.

The following equation illustrates the reaction involved:

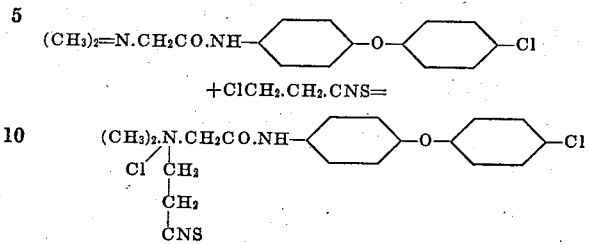

Example 4

17 parts of dimethylaminoacetic acid-3':4'-dichlorophenyl ether phenyl-4-amide (made in the manner described in Example 3 with the variation that instead of para-chlorophenol 3:4-dichlorophenol is used) are dissolved in 50 parts of benzene, 6 parts of α,β-chlorethylene thiocyanate are added and the whole is boiled under reflux for about 24 hours. The product is precipitated by adding much ether and for purification is once reprecipitated from benzene. The adherent solvent is then removed in a vacuum at 40–50° C., whereby there is obtained a spumous substance which dissolves in hot water to an opalescent solution.

The following equation illustrates the reaction involved:

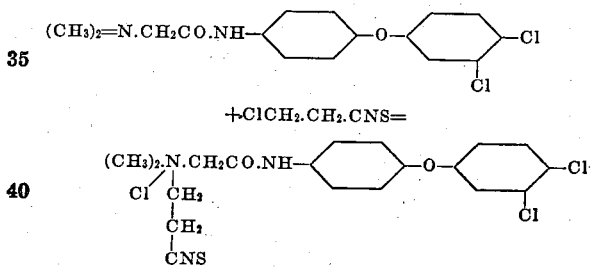

Example 5

17 parts of dimethylaminoacetic acid-2:2'-dichlorodiphenyl ether 4-amide (made analogously to the method described in Example 3) are dissolved in 50 parts of benzene and 6 parts of α,β-chlorethylene thiocyanate are added. After about 24 hours the reaction is interrupted and a product is precipitated by addition of much ether. The semi-solid mass thus obtained is dissolved in alcohol and precipitated from this solution by means of ether; the solvent is then removed in a vacuum. There is thus obtained a semi-solid honey-like mass which dissolves to a turbid solution in water.

The following equation illustrates the reaction involved:

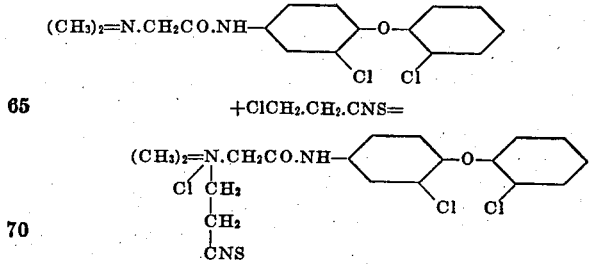

Example 6

19 parts of dimethylaminoacetic acid-2:2':4'-trichlorodiphenyl ether-4-amide (made as described in Example 3 by the reaction of 3:4-dichloronitrobenzene with 2:4-dichlorophenolate and so on) are dissolved in 50 parts of benzene, 6 parts of α,β-chlorethylene thiocyanate are added and the whole is boiled for 24 hours under reflux. The product cannot be precipitated by any of the usual solvents, but can be obtained as a bright powder by removing the solvent; this powder is soluble in hot water, especially on addition of alcohol.

The following equation illustrates the reaction involved:

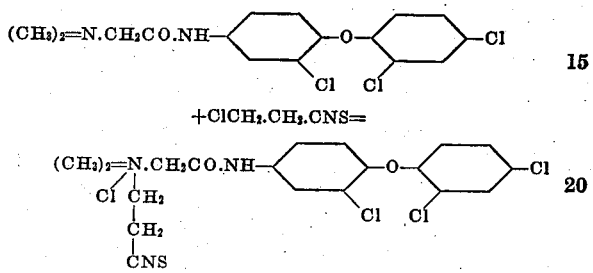

By replacing the α,β-chlorethylene thiocyanate by the equimolecular quantity of bromoacetonitrile, a similar final product is obtained according to the above example.

Example 7

16.5 parts of α,β-chlorethylene thiocyanate and 31.8 parts of dodecyldimethylamine (made in known manner from dodecyl bromide and a dimethylamine solution at 40–60° C.) are stirred with 80 parts of benzene for 8 hours at 50° C. By addition of petroleum ether a flocculent precipitate which cannot be filtered is obtained. This is dissolved in water and the solution is evaporated in a vacuum at 50° C. The residue is a sticky, light-brown mass soluble in water to a clear solution and having good wetting, fungicidal and bactericidal properties.

The following equation illustrates the reaction involved:

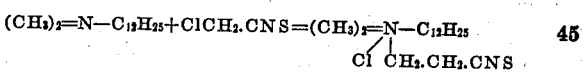

If instead of the α,β-chlorethylene compound an ω-halogenated capronic acid, such as the ω-bromo- or -jodo-capronic acid or α-bromo-capric acid is employed, similar products are obtained.

Example 8

17 parts of the base of the formula

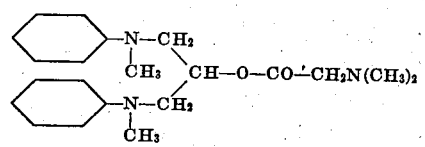

(made by heating methyl aniline with α,α'-glycerol-dichlorhydrin at 120° C. in a closed vessel, causing the product of the reaction to react with chloracetyl chloride in benzene at 50–60° C. and heating the product of this reaction with an aqueous dimethylamine solution of 20 per cent strength) are dissolved in 50 parts of benzene and 6 parts of α,β-chlorethylene thiocyanate are added. The whole is boiled for 48 hours and petroleum ether is added to precipitate the product. The latter is washed with ether and freed from solvent in a vacuum. It is a tough brown mass which dissolves to a turbid solution in water.

The following equation illustrates the reaction involved:

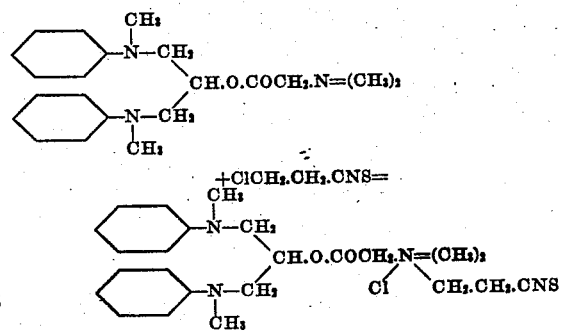

Example 9

17 parts of dimethylaminoacetic acid dodecyl-anilide (made from commercial dodecyl alcohol known as Lorol and aniline in slight excess by heating the mixture until the calculated quantity of water is distilled and causing the product to react with chloracetyl chloride and dimethylamine in known manner) are dissolved in 50 parts of benzene, 6 parts of α,β-chlorethylene thiocyanate are added and the whole is boiled for 14 hours. By adding petroleum ether, washing the precipitate produced and drying it in a vacuum, there is obtained a brownish semi-solid mass which dissolves in water to a clear solution and acts as a very strong fungicide.

The following equation illustrates the reaction involved:

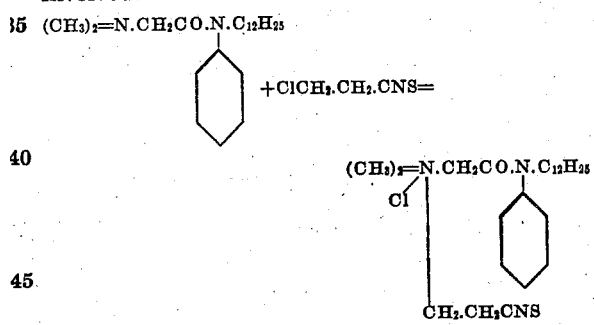

Example 10

17 parts of dimethylaminoacetic acid dodecyl-anilide are dissolved in 50 parts of benzene, 7.5 parts of paracyanobenzyl chloride (or bromide) are added and the whole is boiled for 3–5 hours. Petroleum ether is then added and the precipitate is filtered with suction and dried in a vacuum. The new compound is thus obtained in the form of a semi-solid, amber-coloured mass soluble in water to a clear solution and having good fungicidal and bactericidal properties.

The following equation illustrates the reaction involved:

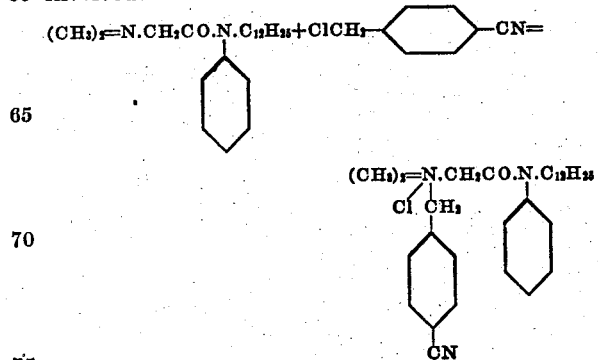

Example 11

10 parts of dimethylaminocyclohexane, made by hydrogenating dimethylaniline, are dissolved in 50 parts of benzene and 10 parts of α,β-chlorethylene thiocyanate are added. The whole is boiled for 4–5 hours and the precipitate produced by adding petroleum ether is filtered with suction. It is a white crystallized body which dissolves clearly in water.

The following equation illustrates the reaction involved:

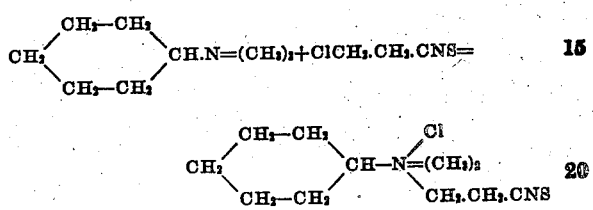

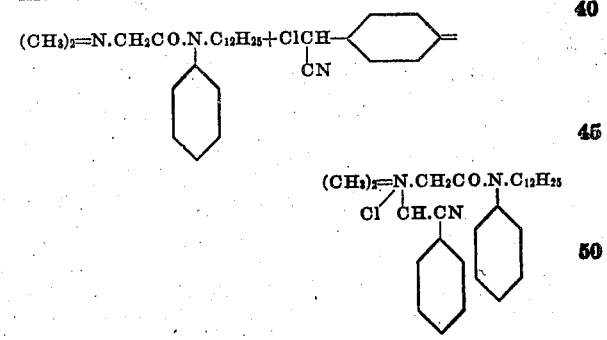

A similar compound is obtained by using as starting material hydrogenated dimethyl-m-toluidine.

Example 12

12 parts of dimethylaminoacetic acid dodecyl-anilide are dissolved in 50 parts of benzene and 6 parts of phenylchloracetonitrile $C_6H_5CHCl.CN$, (or an equimolecular quantity of the bromo-compound) made in known manner from mandelic acid nitrile, are added. After about 20 hours the product is precipitated by adding petroleum ether, the precipitate is subsequently thoroughly washed with the same solvent and then it is dried in a vacuum. It is soluble in water to a turbid solution.

The following equation illustrates the reaction involved:

$(CH_3)_2=N.CH_2CO.N.C_{12}H_{25}+ClCH-\bigcirc=$
$\qquad\qquad\qquad\qquad\qquad\qquad CN$ $(CH_3)_2=N.CH_2CO.N.C_{12}H_{25}$
$Cl\ CH.CN$

Example 13

9 parts of α,β-chlorethylene cyanide and 25 parts of methyl aniline are heated together for 14–16 hours at 110–120° C. The mass has then become semi-solid. Water is added and the whole is neutralized with sodium bicarbonate. The separated mixture of bases is dissolved in ether, the ethereal solution is separated and distilled in a vacuum. The new base having the formula:

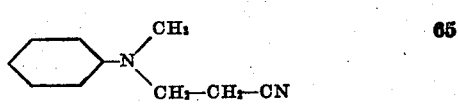

and a boiling point under 12–14 millimetres pressure at 165–170° C., is obtained in the form of a thick yellowish oil. It may be dissolved in an organic solvent or neutralized with acids, for instance hydrochloric acid, sulphuric acid or silicohydrofluoric acid, whereby it is obtained in the form suitable for use.

If the ω-cyanethyl methylaniline is caused to react in known manner with dimethyl sulphate in benzene, there is obtained the quaternary compound in the form of a thick honey-like mass. It dissolves clearly in water and has both fungicidal and bactericidal effects.

The following equation illustrates the reaction involved:

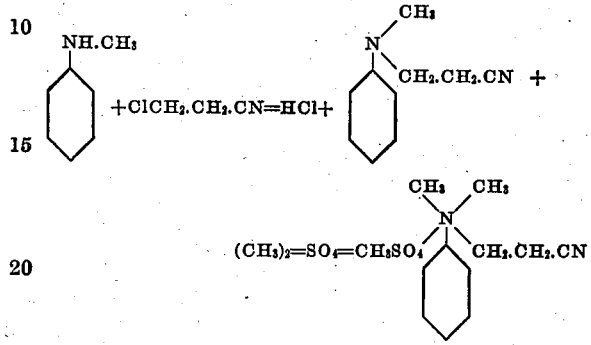

The same compound is obtained if aniline is used instead of methyl aniline and if the intermediate product is completely methylated. Similar compounds are obtained by starting from the toluidines, xylidines or naphthylamines. The tertiary alkylated bases may also be converted into the quaternary compounds by means of aralkylating agents, such as benzylchloride.

*Example 14*

12 parts of α,β-chlorethylene thiocyanate are heated together with 30 parts of ethyl aniline for 14-16 hours at 110-130° C. and the mass is worked up in the manner described in Example 13. The new compound distils in a vacuum of 3 millimetres at 160-175° C. It may be used in the form of base or in aqueous solution united to acids.

By ethylating with diethylsulphate in benzene solution the ammonium compound is produced. It is soluble to a clear solution in water.

The following equation illustrates the reaction involved:

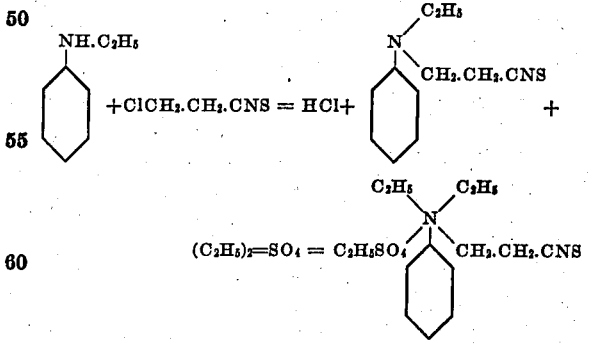

In the same manner, as indicated in Example 13, one may start from aniline to produce the ω-thiocyanethylaniline and exhaustively ethylate, for example with diethylsulphate, thus obtaining the same quaternary compound.

With other primary or secondary organic amines or $NH_3$ there may be obtained as described in Examples 13 and 14, the corresponding bases, their salts and quaternary compounds in large number.

What I claim is:

1. A process for the manufacture of cyano and thiocyano compounds, comprising causing a compound corresponding to the general formula Halogen—R—Y wherein halogen means an exchangeable halogen atom, R means a divalent organic radical selected from the group consisting of aliphatic and araliphatic radicals, and Y means one of —CN and —CNS radicals, to react with a nitrogen compound selected from the group consisting of $NH_3$, primary, secondary and tertiary aliphatic, cycloaliphatic and aromatic amines.

2. A process for the manufacture of cyano and thiocyano compounds, comprising treating compounds of the general formula

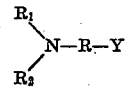

wherein $R_1$ and $R_2$ mean radicals selected from the group consisting of aliphatic and aromatic radicals of the benzene series, R means a divalent organic radical selected from the group consisting of aliphatic and araliphatic radicals, and Y means one of —CN and —CNS radicals, which contain no quaternary substituted amino group with one of the group consisting of alkylating and aralkylating agents.

3. A process for the manufacture of cyano and thiocyano compounds, comprising causing a compound of the general formula Halogen—$C_2H_4$—Y wherein halogen means an exchangeable halogen atom and Y means one of the group consisting of —CN and —CNS radicals, to react with a nitrogen compound selected from the group consisting of $NH_3$, primary, secondary and tertiary aliphatic, cycloaliphatic and aromatic amines.

4. A process for the manufacture of thiocyano compounds, comprising causing α,β-chlorethylenethiocyanate to react with dodecyldimethylamine.

5. A process for the manufacture of thiocyano compounds, comprising causing α,β-chlorethylenethiocyanate to react with an amide of a dialkylamino-acetic acid selected from the group of aliphatic and aromatic amides.

6. A process for the manufacture of thiocyano compounds, comprising causing α,β-chlorethylenethiocyanate to react with dimethylaminoacetic acid - 2:2':4'- trichlorodiphenylether - 4- amide of the formula

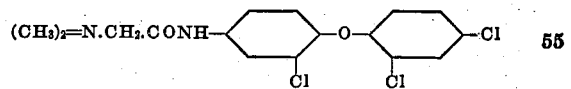

7. A process for the manufacture of thiocyano compounds, comprising causing α,β-chlorethylenethiocyanate to react with dimethylaminoacetic acid dodecylanilide.

8. As new products, the bases of the general formula

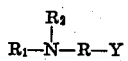

wherein $R_1$ and $R_2$ mean radicals selected from the group consisting of aliphatic and aromatic radicals of the benzene series, R means a divalent organic radical selected from the group consisting of aliphatic and araliphatic radicals and Y means one of the group consisting of —CN and —CNS radicals, and their soluble salts and quaternary compounds.

9. As new products the bases of the general formula

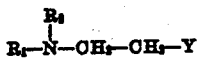

wherein $R_1$ and $R_2$ mean radicals selected from the group consisting of aliphatic and aromatic radicals of the benzene series and Y means one of the group consisting of —CN and —CNS radicals, and their soluble salts and quaternary compounds.

10. As a new product the compound of the formula

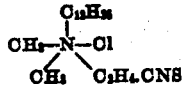

being a sticky, light brown mass soluble in water to a clear solution and having good wetting, fungicidal and bactericidal properties.

11. As a new product the compound of the formula

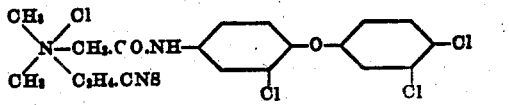

being a bright powder soluble in hot water, especially on addition of alcohol and having good fungicidal properties.

12. As a new product the product the compound of the formula

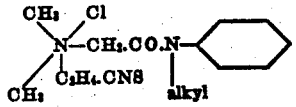

alkyl meaning the alkyl radical of commercial dodecyl alcohol, being a brownish, semi-solid mass which dissolves in water to a clear solution acting as a very strong fungicide.

PAUL MÜLLER.